United States Patent
Jang et al.

(10) Patent No.: US 10,920,077 B2
(45) Date of Patent: Feb. 16, 2021

(54) CONDUCTIVE SILICONE COMPOSITION AND SILICONE COMPOSITE MATERIAL MANUFACTURED THEREBY

(71) Applicant: LG CHEM, LTD., Seoul (KR)

(72) Inventors: Hyung Sik Jang, Daejeon (KR); Se Hyun Kim, Daejeon (KR); Pyeong Gi Kim, Daejeon (KR); Dong Hyun Cho, Daejeon (KR)

(73) Assignee: LG CHEM, LTD, Seoul (KR)

( * ) Notice: Subject to any disclaimer, the term of this patent is extended or adjusted under 35 U.S.C. 154(b) by 0 days.

(21) Appl. No.: 16/492,560

(22) PCT Filed: Nov. 28, 2018

(86) PCT No.: PCT/KR2018/014767
§ 371 (c)(1),
(2) Date: Sep. 9, 2019

(87) PCT Pub. No.: WO2019/112228
PCT Pub. Date: Jun. 13, 2019

(65) Prior Publication Data
US 2020/0040185 A1 Feb. 6, 2020

(30) Foreign Application Priority Data
Dec. 8, 2017 (KR) .................. 10-2017-0167916

(51) Int. Cl.
*H01B 1/24* (2006.01)
*C08L 83/04* (2006.01)
*C08J 3/22* (2006.01)

(52) U.S. Cl.
CPC .............. *C08L 83/04* (2013.01); *C08J 3/226* (2013.01); *H01B 1/24* (2013.01); *C08L 2203/20* (2013.01); *C08L 2205/025* (2013.01); *C08L 2310/00* (2013.01); *C08L 2312/00* (2013.01)

(58) Field of Classification Search
CPC .............. H01B 1/04; C08L 83/04; C09K 5/14
See application file for complete search history.

(56) References Cited

U.S. PATENT DOCUMENTS

| | | | |
|---|---|---|---|
| 2003/0047718 A1* | 3/2003 | Narayan ................. | C08L 83/04 252/500 |
| 2008/0213578 A1 | 9/2008 | Endo et al. | |
| 2010/0308279 A1 | 12/2010 | Zhou et al. | |
| 2011/0275502 A1 | 11/2011 | Eichhorn et al. | |
| 2013/0142960 A1 | 6/2013 | Alexandre et al. | |
| 2015/0148273 A1 | 5/2015 | Matsumoto et al. | |
| 2017/0372815 A1 | 12/2017 | Grau et al. | |
| 2020/0148882 A1 | 5/2020 | Jang et al. | |

FOREIGN PATENT DOCUMENTS

| | | |
|---|---|---|
| CN | 104231919 A | 12/2014 |
| EP | 3584284 A1 | 12/2019 |
| JP | 2005062474 A | 3/2005 |
| JP | 2008038137 A | 2/2008 |
| JP | 2009508999 A | 3/2009 |
| JP | 2017101168 A | 6/2017 |
| KR | 101461994 B1 | 11/2014 |
| KR | 1020160108089 A | 9/2016 |
| KR | 1020170086854 A | 7/2017 |
| KR | 101768153 B1 | 8/2017 |
| KR | 1020170104548 A | 9/2017 |
| WO | 2013161436 A1 | 10/2013 |

* cited by examiner

*Primary Examiner* — Khanh T Nguyen
(74) *Attorney, Agent, or Firm* — Dentons US LLP

(57) ABSTRACT

The present invention relates to a conductive silicone composition including conductive rubber compositions containing 100 parts by weight of liquid silicone and 0.5 to 2.5 parts by weight of carbon nanotubes, wherein the initial viscosity of the liquid silicone is 5,000 to 41,000 cP, the average viscosity of the conductive rubber compositions is 80,000 to 350,000 cP and the viscosity difference between the initial viscosity of the liquid silicone and the average viscosity of the conductive rubber compositions is 70,000 to 310,000 cP. The conductive silicone composition as described above is excellent in processibility when processed into a silicone composite material, and the volume resistance of a manufactured silicone composite material may be greatly improved.

11 Claims, No Drawings

CONDUCTIVE SILICONE COMPOSITION AND SILICONE COMPOSITE MATERIAL MANUFACTURED THEREBY

The present application is a National Phase entry pursuant to 35 U.S.C. § 371 of International Application No. PCT/KR2018/014767 filed Nov. 28, 2018, and claims the priority to and the benefit of Korean Patent Application No. 10-2017-0167916, filed on Dec. 8, 2017, in the Korean Intellectual Property Office, the disclosures of which are incorporated herein in their entirety by reference.

FIELD

The present invention relates to a conductive silicone composition and a silicone composite material manufactured therewith.

BACKGROUND

A conductive silicone rubber composition comprising curable liquid silicone containing a conductive filler such as carbon black, metal powder, a conductive metal oxide, and the like, is included in parts of an electro-photographic device such as a copier, a printer, a plain-paper facsimile machine, a charge roller, a development roller, a phase-change roller and a fixing roller in the form of a silicone composite material as a molded product to be variously applied.

Volume resistance or specific resistance p, known as electrical resistance, is defined as the electrical resistance between opposing surfaces of one cubic meter of a material (1 m$^3$), and it is important that the volume resistance is reproduced within a predetermined range in all of the above applications, and that a molded product having a permanent volume resistance value is obtained. However, when a volume resistance value is relatively large, for example, in a range of 10$^6$ Ω·cm to 10$^{12}$ Ω·cm, it is difficult to reproduce and form a product having an arbitrarily selected volume resistance value. In addition, the range of volume resistance that may be required for parts of an office automation device is highly variable depending on the device and the shape of the parts thereof. Therefore, there is a need for a simple method capable of adjusting the volume resistance of a silicone composite material cured as a molded product.

In addition, a conductive rubber composition containing carbon black may be damaged during curing, or cause a problem in that the hardness of a cured product is lowered after being stored for a long period of time. Such problems are caused by some properties of carbon black, such as the adsorption property and the presence of both surface active groups and impurities. For example, in a liquid silicone rubber composition, a platinum (Pt) base catalyst may be inactivated due to the adsorption property of carbon black and/or the catalytic activity thereof may be suppressed by carbon black impurities. In addition, an additive crosslinking agent for an additive-curable system, typically organopolysiloxane having silicon-bonded hydrogen among liquid silicone rubber compositions, can gradually decompose due to the effects of surface active groups and/or impurities of carbon black.

Accordingly, there is a need for a method capable of easily adjusting and predicting the volume resistance of a silicone composite material, and furthermore solving problems of adding a filler such as carbon black

SUMMARY

An aspect of the present invention provides a conductive silicone composition which controls the initial viscosity of liquid silicone, the viscosity of a conductive rubber composition, the viscosity difference between the two materials, and uses carbon nanotubes as a conductive filler to be mixed with the liquid silicone, and controls the content thereof at the same time, so as to obtain excellent volume resistance after curing the composition, and improve processibility through the control of viscosity, and a silicone composite material in which the composition is cured.

According to an aspect of the present invention, there is provided a silicone composite composition including a catalyst-type conductive rubber composition containing 100 parts by weight of catalyst-type liquid silicone and 0.5 to 2.5 parts by weight of carbon nanotubes; and a crosslinking-type conductive rubber composition containing 100 parts by weight of crosslinking-type liquid silicone and 0.5 to 2.5 parts by weight of carbon nanotubes, wherein the initial viscosity of each of the catalyst-type liquid silicone and the crosslinking-type liquid silicone is 5,000 to 41,000 cP, the average viscosity of each of the conductive rubber compositions is 80,000 to 350,000 Cp, and the viscosity difference between the initial viscosity of the liquid silicones and the average viscosity of the conductive rubber compositions is 70,000 to 310,000 cP, with the viscosity was measured at a temperature of 25° C. and a shear rate of 10 s$^{-1}$.

According to another aspect of the present invention, there is provided a method of manufacturing a silicone composite material, the method including providing the conductive silicone composition described above; and curing the conductive silicone composition A conductive silicone composition according to the present invention has excellent processibility since the viscosity of the materials is controlled at a desired level, provides excellent volume resistance even with a small amount of conductive filler by limiting the initial viscosity of liquid silicone and using carbon nanotubes as a conductive filler, and accordingly, prevents an increase in viscosity of the overall conductive silicone composition, thereby helping improving processibility.

DETAILED DESCRIPTION

Hereinafter, the present invention will be described in more detail to facilitate understanding of the present invention.

It will be understood that words or terms used in the description and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

A silicone composite composition according to an embodiment of the present invention includes a catalyst-type conductive rubber composition containing 100 parts by weight of catalyst-type liquid silicone and 0.5 to 2.5 parts by weight of carbon nanotubes; and a crosslinking-type conductive rubber composition containing 100 parts by weight of crosslinking-type liquid silicone and 0.5 to 2.5 parts by weight of carbon nanotubes, wherein the initial viscosity of each of the catalyst-type liquid silicone and the crosslinking-type liquid silicone is 5,000 to 41,000 cP, the average viscosity of each of the conductive rubber compositions is 80,000 to 350,000 Cp, and the viscosity difference between the liquid silicone and the conductive rubber compositions is 70,000 to 310,000 cP, with the viscosity measured at a temperature of 25° C. and a shear rate of 10 s$^{-1}$.

In the present specification, 'a conductive rubber composition' may refer to a composition in a state in which carbon nanotubes are disposed in liquid silicone.

In the present specification, 'the average viscosity of conductive rubber composition' may refer to the average value of the viscosity of one or more conductive rubber compositions contained in a conductive silicone composition.

According to an embodiment of the present invention, the liquid silicone is an example of a thermosetting resin and may be replaced with a resin such as liquid EPDM, urethane, or modified silicone resin. However, when liquid silicone is used, flame retardancy, heat resistance, and weather resistance may be improved.

The liquid silicone may be classified into catalyst-type liquid silicon containing silicone rubber and a metal catalyst, and crosslinking-type liquid silicon containing silicone rubber and a crosslinking agent. Carbon nanotubes may be included in each thereof to form conductive rubber compositions, and through mixing of the conductive rubber compositions, a conductive silicone composition, that is, a composition in a paste state before being cured into a silicone composite, may be formed.

Specifically, the conductive silicone composition may include a catalyst-type conductive rubber composition including carbon nanotubes and catalyst-type liquid silicone containing a metal catalyst and silicone rubber; and a crosslinking conductive rubber composition including crosslinking liquid silicone containing a crosslinking agent and silicone rubber.

The silicone rubber may have a weight average molecular weight of about 1,000 to 800,000 g/mol, and may act as a major factor in selecting the initial viscosity of liquid silicone. According to a desired initial viscosity, the weight average molecular weight thereof may be appropriately selected. In addition, the silicone rubber may be an organosiloxane polymer containing a double bond at the end thereof in general and may be crosslinked by a specific catalyst.

For example, the organosiloxane polymer may be any one of a dimethylvinylsiloxy-terminated copolymer of dimethylvinylsiloxy-terminated dimethylpolysiloxane, methylvinylsiloxane and dimethylsiloxane, a trimethylsiloxy-terminated copolymer of methylvinylsiloxane and dimethylsiloxane, a dimethylvinylsiloxy-terminated copolymer of methylphenylsiloxane and dimethylsiloxane, a dimethylvinylsiloxy-terminated copolymer of methylphenylsiloxane, methylvinylsiloxane, and dimethylsiloxane, a trimethylsiloxy-terminated copolymer of methylphenylsiloxane, methylvinylsiloxane, and dimethylsiloxane, a dimethylvinylsiloxy-terminated copolymer of diphenylsiloxane and dimethylsiloxane, a dimethylvinylsiloxy-terminated copolymer of diphenylsiloxane, methylvinylsiloxane, and dimethylsiloxane, a dimethylvinylsiloxy-terminated copolymer of methyl (3,3,3-trifluoropropyl) siloxane and dimethylsiloxane, or a dimethylvinylsiloxy-terminated copolymer of methyl (3,3,3-trifluoropropyl) siloxane, methylvinylsiloxane, and dimethylsiloxane, and the like, but is not limited thereto.

The metal catalyst may include platinum (Pt) as a metal, for example, fine platinum powder, platinum black, chloroplatic acid, an alcohol-modified chloroplatinic acid, a complex of olefin and chloroplatinic acid, a complex of chloroplatinic acid and alkenyl siloxane, or a thermoplastic resin powder containing the platinum-based catalyst described above. The metal catalyst may be present in an amount of 0.1 to 500 ppm of metal by weight in the liquid silicone.

In addition, the crosslinking agent may include organic polysiloxane having at least two Si—H bonds per molecule, and the Si—H bond may react with a double bond component of the silicone rubber (an organic siloxane polymer) to form crosslinking between polymers.

The crosslinking agent may include one or more of, for example, trimethylsiloxy-terminated polymethylhydrogensiloxane, a trimethylsiloxy-terminated copolymer of methylhydrogensiloxane and dimethylsiloxane, a dimethylhydrogensiloxy-terminated copolymer of dimethylhydrogensiloxane and dimethylsiloxane, a cyclic copolymer of methylhydrogensiloxane and dimethylsiloxane, organopolysiloxane consisting of cyclic polymethylhydrogensiloxane, a siloxane unit of the formula $(CH_3)_3SiO_{1/2}$, a siloxane unit of the formula $SiO_{4/2}$, and a siloxane unit of the formula $(CH_3)_2HSiO_{1/2}$, organopolysiloxane consisting of a siloxane unit of the formula $(CH_3)_2HSiO_{1/2}$, and a siloxane unit of the formula $CH_3SiO_{3/2}$, organopolysiloxane consisting of a siloxane unit of the formula $(CH_3)_2HSiO_{1/2}$, a siloxane unit of the formula $(CH_3)_2SiO_{2/2}$, and a siloxane unit of $SiH_3SiO_{3/2}$, dimethylhydrogensiloxy-terminated polydimethylsiloxane, a dimethylhydrogensiloxy-terminated copolymer of methylphenylsiloxane and dimethylsiloxane, and/or a dimethylhydrogensiloxy-terminated copolymer of methyl (3,3,3-trifluoropropyl) siloxane, and dimethylsiloxane.

As described above, the catalyst-type liquid silicone may contain silicone rubber and a metal catalyst, and the crosslinking-type liquid silicone may contain silicone rubber and a crosslinking agent. In addition, carbon nanotubes may be included in each of the catalyst-type liquid silicone and the crosslinking-type liquid silicone to form a catalyst-type rubber composition and a crosslinking-type conductive rubber composition.

As described above, the catalyst-type liquid silicone and the crosslinking-type liquid silicone may have an initial viscosity of about 5,000 to 41,000 cP, preferably 5,000 to 40,000 cP, and most preferably 6,000 to 38,000. Although the liquid silicone is classified into a catalyst-type and a crosslinking-type depending on the kind of a material to be added, the initial viscosity of the liquid silicone is not affected by whether it is a catalyst-type or a crosslinking-type. The term "the initial viscosity of liquid silicone" may refer to "the initial viscosity" of both the catalyst-type and the crosslinking-type unless specifically mentioned otherwise.

In addition, the catalyst-type conductive rubber composition and the crosslinking-type conductive rubber composition may have an average viscosity of 80,000 to 350,000 cP, more preferably 100,000 to 350,000 cP, or 150,000 to 350,000 cP, and even more preferably, 185,000 to 350,000 cP, and most preferably 210,000 to 350,000 cP. This may be related to the content of carbon nanotubes, and when the viscosity of the compositions is in the above range, the processibility is excellent.

The viscosity difference between the initial viscosity of the liquid silicones and the average viscosity of the conductive rubber compositions containing carbon nanotubes is 70,000 to 310,000.

More specifically, the viscosity difference between the initial viscosity of the liquid silicones and the average viscosity of the conductive rubber compositions may be 100,000 to 310,000 cP, more preferably from 140,000 to 310,000 cP, even more preferably 180,000 to 310,000 cP, or 210,000 to 310,000 cP.

As such, the viscosity difference between the initial viscosity of liquid silicones and the average viscosity of a conductive rubber compositions may be one measure of how well carbon nanotubes are dispersed as a conductive filler. Specifically, the lower limit of the difference value may be meaningful for the dispersibility of a conductive filler, and the upper limit of the difference value may be meaningful for the degree of processability.

Meanwhile, when carbon black, not carbon nanotubes, is used as a conductive filler, the amount thereof needed to achieve a required volume resistance value may be substantial, and accordingly, the viscosity of the conductive rubber composition is greatly increased, causing a problem in which processability is deteriorated.

However, according to an embodiment of the present invention, the carbon nanotubes are included in an amount of 0.5 to 2.5 parts by weight based on 100 parts by weight of liquid silicone, preferably 1 to 2 parts by weight. When the carbon nanotubes are contained in such a range, the viscosity of the conductive rubber composition may be obtained in the above range, so that processability may be excellent. In the content, not only the processability but also the conductivity may be maximized. However, although the amount of carbon nanotubes to be added and the limitations related to the viscosity may affect each other, it is difficult to see it as a completely subordinate relationship. In addition to the amount of carbon nanotubes to be added, methods of mixing a conductive rubber composition may also have an effect.

The carbon nanotubes may be, for example, multi-walled carbon nanotubes. The carbon nanotubes are not specifically limited, and any one of single-walled carbon nanotubes and multi-walled carbon nanotubes, such as a double-walled carbon nanotubes, may be used. The carbon nanotubes may be prepared by, for example, an arc discharge method, a laser evaporation method, a chemical vapor deposition method, a hydrocarbon catalytic decomposition method, and the like. When the aspect ratio of the carbon nanotubes is large, dispersibility may be deteriorated since it is difficult to untie carbon nanotubes entangled in a bindle state. The aspect ratio of carbon nanotubes is not particularly limited, but may be preferably, for example, 5 to 10,000.

The catalyst-type rubber composition and the crosslinking-type rubber composition are mixed to form a conductive silicone composition paste, and the paste may be cured to form a silicone composite material. The conductive silicone rubber composition may contain 5 to 95 wt % of the catalyst-type rubber composition and 5 to 95 wt % of the crosslinking-type rubber composition, preferably 10 to 90 wt % and 90 to 10 wt % respectively, more preferably 30 to 70 wt % and 70 to 30 wt % respectively, most preferably 40 to 60 wt % and 60 to 40 wt % respectively. In some cases, since the content between a catalyst and a crosslinking agent needs to be appropriately adjusted, the mixing ratio of the two rubber compositions needs to be appropriately controlled.

That is, when the content of either a crosslinking agent or a catalyst is greater, for example, when the amount of the crosslinking agent is greater than that of the catalyst, there may be a material for causing a crosslinking reaction, but conditions are not sufficient, and when the amount of the catalyst is greater than that of the crosslinking agent, conditions are satisfactory, but materials are somewhat lacking.

When the initial viscosity of liquid silicone, the amount of carbon nanotubes to be added, and the average viscosity of conductive rubber composition satisfy the above-described values, after the composition is cured, the volume resistance value thereof may be considerably low, specifically, 100 $\Omega \cdot cm$ or less. In order to achieve a volume resistance value of 100 $\Omega \cdot cm$ or less, at least 20 parts by weight of carbon black should be added, which may cause deterioration in processability. However, according to the present invention, it is possible to have a considerably low volume resistance value even by adding an extremely small amount of carbon nanotubes. The volume resistance value may preferably be 75 $\Omega \cdot cm$ or less, more preferably 50 $\Omega \cdot cm$ or less. In addition, the conductive silicone composition may have a surface resistance value of 300 $\Omega/sq$ or less after curing, preferably 250 $\Omega/sq$ or less.

As described above, since the volume resistance and the surface resistance are low and the viscosity is at an appropriate level having a specific value, a silicone composite material manufactured according to the present invention may be applied to a product having excellent antistatic property, and since the productivity is excellent in mass production, the price competitiveness of the product may be significantly improved.

According to another embodiment of the present invention, a conductive silicone composition includes a catalyst-type conductive rubber composition containing 100 parts by weight of catalyst-type liquid silicone and 0.5 to 2.5 parts by weight of carbon nanotubes; and a crosslinking-type conductive rubber composition containing 100 parts by weight of crosslinking-type liquid silicone and 0.5 to 2.5 parts by weight of carbon nanotubes, wherein the initial viscosity of each of the catalyst-type liquid silicone and the crosslinking-type liquid silicone is 5,000 to 41,000 cP, the average viscosity of the conductive rubber compositions is 80,000 to 350,000 cP, the carbon nanotubes have a diameter of 5 to 100 nm and an aspect ratio of 5 to 10,000, and forms secondary agglomerated carbon nanotubes by agglomerating non-linear state carbon nanotubes in which a graphite layer is stretched almost in parallel to a fiber axis, and the secondary agglomerated carbon nanotubes have a diameter of 0.1 μm or greater, a length of 5 μm or greater, and a ratio of long diameter to short diameter of 5 or greater.

The carbon nanotubes may have, for example, a shape of secondary agglomerated carbon nanotubes in which primary carbon nanotubes are agglomerated. In this case, since the shape of the primary carbon nanotubes is in a non-linear state, the cohesive force may be stronger when agglomerated to the secondary carbon nanotubes, and since the frequency of disconnection is reduced when compared with a case in which the network among carbon nanotubes is linear, so that even with a small amount, a high conductive effect may be achieved.

In addition, the primary carbon nanotubes may have a diameter of 5 to 100 nm, preferably 5 to 70 nm. In addition, the primary carbon nanotubes may have an aspect ratio of 5 to 10,000, and the diameter and length of the carbon nanotubes may be measured through an electron microscope. When the carbon nanotubes have a diameter and an aspect ratio as described above, when agglomerated into secondary carbon nanotubes, an orientation property may be obtained. When the orientation property is obtained, there may be an advantage in that an effect of high conductivity may be achieved even with a small amount.

In addition, the primary carbon nanotubes may be one in which a graphite layer is stretched substantially parallel to a fiber axis, and here, being parallel may mean that the slope of the graphite layer with respect to the fiber axis is within about ±15 degrees, and the graphite layer is a graphene sheet constituting a carbon fiber and may be observed as a stripe in an electron microscope (TEM) photograph.

The length of the graphite layer is preferably 0.02 to 15 times the diameter of the carbon nanotubes, and the shorter the length of the graphite layer, the stronger the adhesion strength to silicone rubber when mixed with liquid silicone, so that it is possible to improve the mechanical strength of a silicone composite material. The length of the graphite layer and the slope of the graphite layer may be measured by observation of an electron microscope photograph and the like.

It may be preferable that the primary carbon nanotubes are agglomerated to form secondary agglomerated carbon nanotubes. The structure of the carbon nanotube agglomerate may be specified by observing an electron microscope photograph, and the diameter, length and the like may be specified by using the average of several tens to several hundreds of carbon nanotube agglomerates observed using an electron microscope photograph.

The secondary agglomerated carbon nanotubes have a diameter of typically 0.1 to 100 μm, preferably 1 to 100 μm, more preferably 5 to 100 μm, still more preferably 10 to 50 μm, and the secondary agglomerated carbon nanotubes have a length of typically 5 to 500 μm, preferably 10 to 500 μm, and more preferably 20 to 200 μm. The length and diameter of such a range may be preferable in aligning the secondary carbon nanotubes, and may be more preferable in easily forming a highly dispersed state.

The secondary agglomerated carbon nanotubes may have a greater conductivity imparting effect as the ratio of long diameter to short diameter is larger. The ratio of long diameter to short diameter may be at least 3, preferably 5 or greater, and more preferably 7 or greater. The short diameter is preferably 50 μm or greater, more preferably 100 μm or greater, and even more preferably 300 μm or greater.

According to another embodiment of the present invention, a manufacturing method of the silicone composite material includes providing the conductive silicone composition described above; and curing the conductive silicone composition.

Providing the conductive silicone composition may include mixing liquid silicone and carbon nanotubes, and the mixing may be performed with dispersing equipment such as a roll mill. When using equipment such as a roll mill, the dispersion of carbon nanotubes may be smoothly performed, and accordingly, additional steps such as pre-mixing and pre-dispersion may be unnecessary.

For example, the roll mill operation may be performed one to five times, preferably two to three times, and it is preferable that two or more rolls are used. The pressure acting between the two or more rolls may be about 2 to 6 bars in general, but is not limited thereto. When the viscosity conditions described above is satisfied, other methods may be applied.

The curing of the conductive silicone composition is not particularly limited, and may be performed through heat treatment at a predetermined temperature for a predetermined period of time. For example, the curing may be performed at a temperature of 150° C. or higher, preferably at 170° C. or higher, more preferably at 180° C. or higher, and may be performed for 10 minutes or more, preferably for 30 minutes or more, more preferably for 50 minutes or more. However, the curing conditions may be applied appropriately such that when the curing temperature is low, the curing time may be increased, and when the curing temperature is high, the curing time may be decreased.

When the roll mill process and the curing process are appropriately controlled as described above, all the aspects concerning the viscosity proposed in the present invention may be satisfied, and due to the synergistic effect with a material used as a conductive filler, a silicone composite material having excellent processability and excellent conductivity may be provided.

According to another embodiment of the present invention, provided is a conductive material containing the silicone composite material described above.

The conductive materials may vary, and may be a resin material that generally requires conductivity. For example, the conductive material may be applied to a contact portion requiring conductivity, such as an antistatic pad, a conductive fiber, a keyboard or a keypad. Generally, any material to which a silicone composite material using liquid silicone can be applied is applicable without any particular limitation.

EXAMPLES

Hereinafter, the present invention will be described in detail with reference to embodiments. However, the embodiments according to the present invention can be modified into various different forms, and the scope of the present invention should not be construed as being limited to the embodiments described below. The embodiments of the present invention are provided to more fully describe the present invention to those skilled in the art.

Example 1

Preparation of Conductive Silicone Composition

To 100 parts by weight of catalyst-type liquid silicone having an initial viscosity of 6,000 cP (measured using TA Instrument Co.'s AR-2000, at a temperature of 25° C. and a shear rate of 10 $s^{-1}$) and containing a platinum catalyst and silicone rubber, 1 part by weight of carbon nanotubes are added and mixed using a three-roll mill at a roll-to-roll speed ratio of 1:3.2:10 and a pressure of 4 bar. The roll-mill mixing was repeated three times to prepare a catalyst-type conductive rubber composition, and to crosslinking-type liquid silicone having an initial viscosity of 6,000 cP and containing a crosslinking agent and silicone rubber, 1 part by weight of carbon nanotubes based on 100 parts by weight of the liquid silicone were added and mixed in the same manner as in the preparation of the catalyst-type conductive rubber composition to prepare a crosslinking-type conductive rubber composition.

Manufacturing of Silicone Composite Material

The catalyst-type conductive rubber composition and the crosslinking-type conductive rubber composition were mixed in a weight ratio of 1:1, and the mixed conductive rubber composition was heat-treated at 180° C. for 1 hour to cure the composition to prepare a silicone composite material.

Example 2

A silicone composite material was manufactured in the same manner as in Example 1 except that 1.5 parts by weight of carbon nanotubes were added.

Example 3

A silicone composite material was manufactured in the same manner as in Example 1 except that 2 parts by weight of carbon nanotubes were added.

Example 4

A silicone composite material was manufactured in the same manner as in Example 1 except that the initial viscosity was 20,000 cP.

Example 5

A silicone composite material was manufactured in the same manner as in Example 3 except that the initial viscosity was 20,000 cP.

Example 6

A silicone composite material was manufactured in the same manner as in Example 1 except that the initial viscosity was 38,000 cP.

Example 7

A silicone composite material was manufactured in the same manner as in Example 3 except that the initial viscosity was 38,000 cP.

Comparative Example 1

A silicone composite material was manufactured in the same manner as in Example 1 except that carbon nanotubes were not added.

Comparative Example 2

A silicone composite material was manufactured in the same manner as in Example 1 except that 10 parts by weight of carbon black was added instead of carbon nanotubes.

Comparative Example 3

A silicone composite material was manufactured in the same manner as in Example 1 except that 20 parts by weight of carbon black was added instead of carbon nanotubes.

Comparative Example 4

A silicone composite material was manufactured in the same manner as in Example 1 except that 30 parts by weight of carbon black was added instead of carbon nanotubes.

Comparative Example 5

A silicone composite material was manufactured in the same manner as in Example 1 except that liquid silicone having an initial viscosity of 500 cP was used.

Comparative Example 6

A silicone composite was manufactured in the same manner as in Example 1 except that liquid silicone having an initial viscosity of 45,000 cP was used.

Comparative Example 7

A silicone composite material was manufactured in the same manner as in Example 1 except that 0.4 parts by weight of carbon nanotubes were added.

Comparative Example 8

A silicone composite material was manufactured in the same manner as in Example 1 except that 3 parts by weight of carbon nanotubes were added.

Experimental Example 1

Measurement of Viscosity Change

The viscosity of the conductive silicone compositions was measured in order to confirm the change in viscosity according to the roll-mill mixing times of the conductive silicone composition during the preparation in the above Examples and Comparative Examples.
Viscosity (cP)
The viscosity was measured using TA Instrument Co.'s AR-2000 at a temperature of 25° C. and a shear rate of 10 s$^{-1}$.

TABLE 1

| | Before mixing | After mixing | | | | | |
|---|---|---|---|---|---|---|---|
| | Initial | After a first roll mill operation (cP) | | After a second roll mill operation (cP) | | After a third roll mill operation (cP) | |
| | viscosity (cP) | 1 Composition | 2 Composition | 1 Composition | 2 Composition | 1 Composition | 2 Composition |
| Example 1 | 6,000 | 89,000 | 105,000 | 92,000 | 115,000 | 117,000 | 125,000 |
| Example 2 | 6,000 | 115,000 | 134,000 | 205,000 | 231,000 | 227,000 | 242,000 |
| Example 3 | 6,000 | 224,000 | 241,000 | 277,000 | 291,000 | 302,000 | 310,000 |
| Example 4 | 20,000 | 145,000 | 147,000 | 164,000 | 168,000 | 176,000 | 182,000 |
| Example 5 | 20,000 | 224,000 | 231,000 | 278,000 | 282,000 | 318,000 | 320,000 |
| Example 6 | 38,000 | 158,000 | 161,000 | 172,000 | 178,000 | 188,000 | 191,000 |
| Example 7 | 38,000 | 257,000 | 261,000 | 301,000 | 319,000 | 339,000 | 348,000 |
| Comparative Example 1 | 6,000 | 6,000 | 6,000 | 6,000 | 6,000 | 6,000 | 6,000 |
| Comparative Example 2 | 6,000 | 33,000 | 37,000 | 54,000 | 63,000 | 65,000 | 69,000 |
| Comparative Example 3 | 6,000 | 188,000 | 203,000 | 248,000 | 271,000 | 254,000 | 282,000 |
| Comparative Example 4 | 6,000 | 752,000 | 794,000 | 830,000 | 861,000 | 880,000 | 920,000 |
| Comparative Example 5 | 500 | 22,000 | 25,000 | 39,000 | 44,000 | 68,000 | 72,000 |
| Comparative Example 6 | 45,000 | 132,000 | 151,000 | 140,000 | 161,000 | 164,000 | 175,000 |

TABLE 1-continued

| | Before mixing Initial viscosity (cP) | After mixing | | | | | |
|---|---|---|---|---|---|---|---|
| | | After a first roll mill operation (cP) | | After a second roll mill operation (cP) | | After a third roll mill operation (cP) | |
| | | 1 Composition | 2 Composition | 1 Composition | 2 Composition | 1 Composition | 2 Composition |
| Comparative Example 7 | 6,000 | 11,000 | 14,000 | 45,000 | 48,000 | 56,000 | 58,000 |
| Comparative Example 8 | 6,000 | 506,000 | 524,000 | 638,000 | 649,000 | 745,000 | 761,000 |

Referring to Table 1, when the carbon nanotubes are dispersed in the liquid silicone through a roll milling, the viscosity gradually increases with the number of times of roll milling, so that it can be inferred that the dispersion of carbon nanotubes is uniformly performed well.

Specifically, when comparing Comparative Examples 7 and 8 in which the carbon nanotubes were not controlled to be 0.5 to 2.5 parts by weight, in the case of Comparative Example 7, the amount of carbon nanotubes are too small that the viscosity of the conductive silicone composition does not reach 80,000 cP. In the case of Comparative Example 8, the content of carbon nanotubes is excessive so that the viscosity exceeds 350,000 cP, and thus at least two times or more viscosity values are obtained compared with those of Examples. Therefore, it can be confirmed that the content of carbon nanotubes should be adjusted to the desired level.

Experimental Example 2

Measurement of Resistance

The surface resistance and the volume resistance were measured to confirm the resistance value of the silicone composite materials prepared in the Examples and Comparative Examples.

Volume Resistance

The volume resistance was measured by applying a voltage of 90 V using Loresta MCP-T600 of Mitsubishi Co., and a probe of a 4-probe type was used. A volume resistance option was selected (ohm·cm) to measure front and rear surfaces of a specimen by five times each and the average was recorded.

Surface Resistance

The surface resistance was measured by applying a voltage of 90 V using Loresta MCP-T600 of Mitsubishi Co., and a probe of 4-probe type was used. A surface resistance option was selected (ohm/sq) to measure front and rear surfaces of a specimen by five times each and the average was recorded.

TABLE 2

| | Initial viscosity (cP) | After a third roll mill operation (cP) | | | Viscosity Difference | Surface resistance ($\Omega$/sq) | Volume resistance ($\Omega \cdot$ cm) |
|---|---|---|---|---|---|---|---|
| | | 1 Composition | 2 Composition | Average | | | |
| Example 1 | 6,000 | 117,000 | 125,000 | 121,000 | 115,000 | 250 | 50 |
| Example 2 | 6,000 | 227,000 | 242,000 | 234,500 | 228,500 | 75 | 15 |
| Example 3 | 6,000 | 302,000 | 310,000 | 306,000 | 300,000 | 35 | 7 |
| Example 4 | 20,000 | 176,000 | 182,000 | 179,000 | 159,000 | 100 | 20 |
| Example 5 | 20,000 | 318,000 | 320,000 | 319,000 | 299,000 | 30 | 6 |
| Example 6 | 38,000 | 188,000 | 191,000 | 189,500 | 151,500 | 140 | 28 |
| Example 7 | 38,000 | 339,000 | 348,000 | 343,500 | 305,500 | 40 | 8 |
| Comparative Example 1 | 6,000 | 6,000 | 6,000 | 6,000 | 0 | — | — |
| Comparative Example 2 | 6,000 | 65,000 | 69,000 | 67,000 | 61,000 | 1800 | 360 |
| Comparative Example 3 | 6,000 | 254,000 | 282,000 | 268,000 | 262,000 | 500 | 100 |
| Comparative Example 4 | 6,000 | 880,000 | 920,000 | 900,000 | 894,000 | 375 | 75 |
| Comparative Example 5 | 500 | 68,000 | 72,000 | 70,000 | 69,500 | 400 | 80 |
| Comparative Example 6 | 45,000 | 164,000 | 175,000 | 169,500 | 124,500 | $10^6$~$10^7$ | $10^5$~$10^7$ |
| Comparative Example 7 | 6,000 | 56,000 | 58,000 | 57,000 | 51,000 | $10^3$~$10^5$ | $10^3$~$10^4$ |
| Comparative Example 8 | 6,000 | 745,000 | 761,000 | 753,000 | 747,000 | 15 | 3 |

Referring to Table 2, in the case of Examples 1 to 7, since the conductive filler is carbon nanotubes, even though 0.5 to 2.5 parts by weight thereof was present, it was confirmed that the conductive filler has considerably low volume resistance and surface resistance. In the case of Comparative Examples 2 to 4 in which carbon black was added, even though 30 parts by weight of thereof was added, it was confirmed that poorer properties were obtained compared to when 1 part by weight of carbon nanotubes was added. When 30 parts by weight of carbon black was added, the viscosity was increased close to 1,000,000 cP, so that it can be predicted that a fatal problem may be caused to the processing equipment.

In addition, in the case of Comparative Example 5, the same amount of carbon nanotubes as in Example 1 was added, but the initial viscosity was low. In other words, since the chain length of a Si—O polymer is short and the silicone itself has no physical properties at all, so that the conductive silicone composition has a viscosity of less than 80,000 cP. In the case of Comparative Example 6, the viscosity of the final conductive silicone composition may be at an appropriate level, but since the volume resistance is too large so that it can be confirmed that it is impossible to manufacture a product at a desired level.

In addition, as shown in Comparative Examples 7 and 8 in which the content of carbon nanotubes was not controlled, in Comparative Example 7 in which 0.4 parts by weight of carbon nanotubes were added, the viscosity did not reach a desired level and the volume resistance was considerably poor. In Comparative Example 8 in which 3 parts by weight of carbon nanotubes were added, the volume resistance was excellent but the viscosity was considerably high, so that it can be inferred that a problem in processibility may be caused.

That is, to this end, when the content of carbon nanotubes is controlled to be 0.5 to 2.5 parts by weight based on 100 parts by weight of liquid silicone, and the initial viscosity of the liquid silicone and the viscosity of a conductive silicone composition in which the carbon nanotubes are mixed are controlled, it is possible to obtain an appropriate level of viscosity so that it can be confirmed that a silicone composite material having excellent processibility and improved volume resistance and surface resistance may be provided.

The invention claimed is:

1. A conductive silicone composition comprising:
   a catalyst-type conductive rubber composition containing 100 parts by weight of catalyst-type liquid silicone and 0.5 to 2.5 parts by weight of carbon nanotubes; and
   a crosslinking-type conductive rubber composition containing 100 parts by weight of crosslinking-type liquid silicone and 0.5 to 2.5 parts by weight of carbon nanotubes, wherein
   the initial viscosity of each of the catalyst-type liquid silicone and the crosslinking-type liquid silicone is 5,000 to 41,000 CP,
   the average viscosity of the conductive rubber compositions is 80,000 to 350,000 cP,
   the viscosity difference between the initial viscosity of the liquid silicones and the average viscosity of the conductive rubber compositions is 70,000 to 310,000, and
   the viscosity was measured at a temperature of 25° C. and a shear rate of 10 s$^{-1}$.

2. The conductive silicone composition of claim 1, wherein
   the initial viscosity of the liquid silicones is 5,000 to 40,000 cP.

3. The conductive silicone composition of claim 1, wherein
   the average viscosity of the conductive rubber compositions is 100,000 to 350,000 cP.

4. The conductive silicone composition of claim 1, wherein
   the viscosity difference between the initial viscosity of the liquid silicones and the average viscosity of the conductive rubber compositions is 100,000 to 310,000.

5. The conductive silicone composition of claim 1, wherein
   the carbon nanotubes contained in the catalyst-type rubber composition or the crosslinking-type rubber composition are included in an amount of 1 to 2 parts by weight respectively based on 100 parts by weight of the catalyst-type liquid silicone or the crosslinking-type liquid silicone.

6. The conductive silicone composition of claim 1, wherein
   the catalyst-type liquid silicone comprises a metal catalyst and silicone rubber, and
   the crosslinking-type liquid silicone comprises a crosslinking agent and silicone rubber.

7. The conductive silicone composition of claim 1, wherein the conductive silicone composition comprises 5 to 95 wt % of the catalyst-type conductive rubber composition and 5 to 95 wt % of the crosslinking-type conductive rubber composition.

8. The conductive silicone composition of claim 1, wherein
   the carbon nanotubes have a diameter of 5 to 100 nm and an aspect ratio of 5 to 10,000, and form secondary agglomerated carbon nanotubes by agglomerating nonlinear state carbon nanotubes in which a graphite layer is stretched in a direction parallel to a fiber axis, and
   the secondary agglomerated carbon nanotubes have a diameter of 0.1 µm or greater, a length of 5 µm or greater, and a ratio of long diameter to short diameter of 5 or greater.

9. A conductive silicone composite material comprising a cured silicone composition according to claim 1.

10. A method of manufacturing the silicone composite material of claim 9, the method comprising:
    preparing the catalyst-type conductive rubber composition and the crosslinking-type conductive rubber composition; and
    mixing the catalyst-type conductive rubber composition and the crosslinking-type conductive rubber composition to form a mixed composition; and
    curing the mixed composition.

11. The method of claim 10, wherein
    the catalyst-type conductive rubber composition and the crosslinking-type conductive rubber composition are prepared by mixing liquid silicone and carbon nanotubes, and the mixing is performed by a roll mill operation comprising one to five roll milling operations.

* * * * *